United States Patent
Paulus et al.

(10) Patent No.: US 7,743,010 B2
(45) Date of Patent: Jun. 22, 2010

(54) METHOD AND DEVICE FOR ENCODING A SCORE OF SEMANTIC AND SPATIAL SIMILARITY BETWEEN CONCEPTS OF AN ONTOLOGY STORED IN HIERARCHICALLY NUMBERED TRELLIS FORM

(75) Inventors: François Paulus, Rennes (FR); Alain Bidault, Rennes (FR)

(73) Assignee: France Telecom, Paris (FR)

( * ) Notice: Subject to any disclaimer, the term of this patent is extended or adjusted under 35 U.S.C. 154(b) by 551 days.

(21) Appl. No.: 11/812,777

(22) Filed: Jun. 21, 2007

(65) Prior Publication Data
US 2008/0010260 A1   Jan. 10, 2008

(30) Foreign Application Priority Data
Jun. 21, 2006   (FR) .................. 06 05541

(51) Int. Cl.
G06F 17/00   (2006.01)
G06N 5/02   (2006.01)

(52) U.S. Cl. ....................................... 706/46
(58) Field of Classification Search ............ 706/46
See application file for complete search history.

(56) References Cited
U.S. PATENT DOCUMENTS

| | | | |
|---|---|---|---|
| 5,398,199 A * | 3/1995 | Lefons | 708/446 |
| 6,021,266 A * | 2/2000 | Kay | 716/2 |
| 6,519,586 B2 * | 2/2003 | Anick et al. | 707/3 |
| 7,085,708 B2 * | 8/2006 | Manson | 704/9 |
| 7,489,727 B2 * | 2/2009 | Liu et al. | 375/240.01 |

FOREIGN PATENT DOCUMENTS
FR   2 880 714   7/2005

OTHER PUBLICATIONS

Information Seeking Spoken Dialogue Systems—Part I: Semantics and Pragmatics, Ammicht, E.; Fosler-Lussier, E.; Potamianos, A.; Multimedia, IEEE Transactions on vol. 9, Issue 3, Apr. 2007 pp. 532-549 Digital Object Identifier 10.1109/TMM.2006.888011.*

(Continued)

*Primary Examiner*—Michael B Holmes
(74) *Attorney, Agent, or Firm*—McKenna Long & Aldridge LLP

(57) ABSTRACT

A method of calculating and encoding a score of semantic and spatial similarity between concepts of an ontology stored in hierarchically numbered trellis form, in which the score ($NS\text{-}S_{ij}$) is calculated and encoded (1) for each concept ($C_i$) with respect to a central concept ($C_j$), taken two-by-two, by convergence relative to their common semantic characteristics respectively by separation according to their distance. The method is applicable to the consultation of ontologies representative of knowledge in the technical or non-technical domain.

16 Claims, 8 Drawing Sheets

OTHER PUBLICATIONS scale-invariant local descriptor for event recognition in 1D sensor signals, Jierui Xie; Beigi, M.S.; Multimedia and Expo, 2009. ICME 2009. IEEE International Conference on Jun. 28 2009-Jul. 3 2009 pp. 1226-1229 Digital Object Identifier 10.1109/ICME.2009.5202722.*

Robust parsing for spoken language systems, Seneff, S.; Acoustics, Speech, and Signal Processing, 1992. ICASSP-92., 1992 IEEE International Conference on vol. 1, Mar. 23-26, 1992 pp. 189-192 vol. 1 Digital Object Identifier 10.1109/ICASSP.1992.225940.*

Random-Walk Term Weighting for Improved Text Classification, Hassan, S.; Mihalcea, R.; Banea, C.; Semantic Computing, 2007 ICSC 2007. International Conference on Sep. 17-19, 2007 pp. 242-249 Digital Object Identifier 10.1109/ICSC.2007.56.*

Bidault, A., *Affinement de Requêtes Posées à un Médiateur*, 8 juillet 2002, XP 002379890 Extrait Internet [http://www.lri.fr/bidault/21.htm] (extrait le 2006 05) (see p. 33).

Bognar, K., *Aspects Theoriques de la classification a base de trellis*, (Teaching Mathematics and Computer Science) vol. I n 1, Dec. 31, 2003, pp. 125-135 PXP 002379891, University of Debrecen.

Ferre, S., *Systems d'information logiques : un paradigme logico-contextuel pour interroger, naviguer et apprendre* XP 002379893, Oct. 21, 2002, Ph.D. Thesis, Université de Rennes.

Safar B., et al., *Domain Ontology and Galois Lattice Structure for Query Refinement*, IEEE, Nov. 2003, p. 597-601, XP002379892.

* cited by examiner

| $C_i$ | $I_i$ |
|---|---|
| D | 1 |
| G | 2 |
| C | 11 |
| B | 111 |
| E | 112 |
| H | 113 · 21 |
| A | 1111 · 1121 |
| F | 1112 · 1122 |
| I | 1131 · 211 |

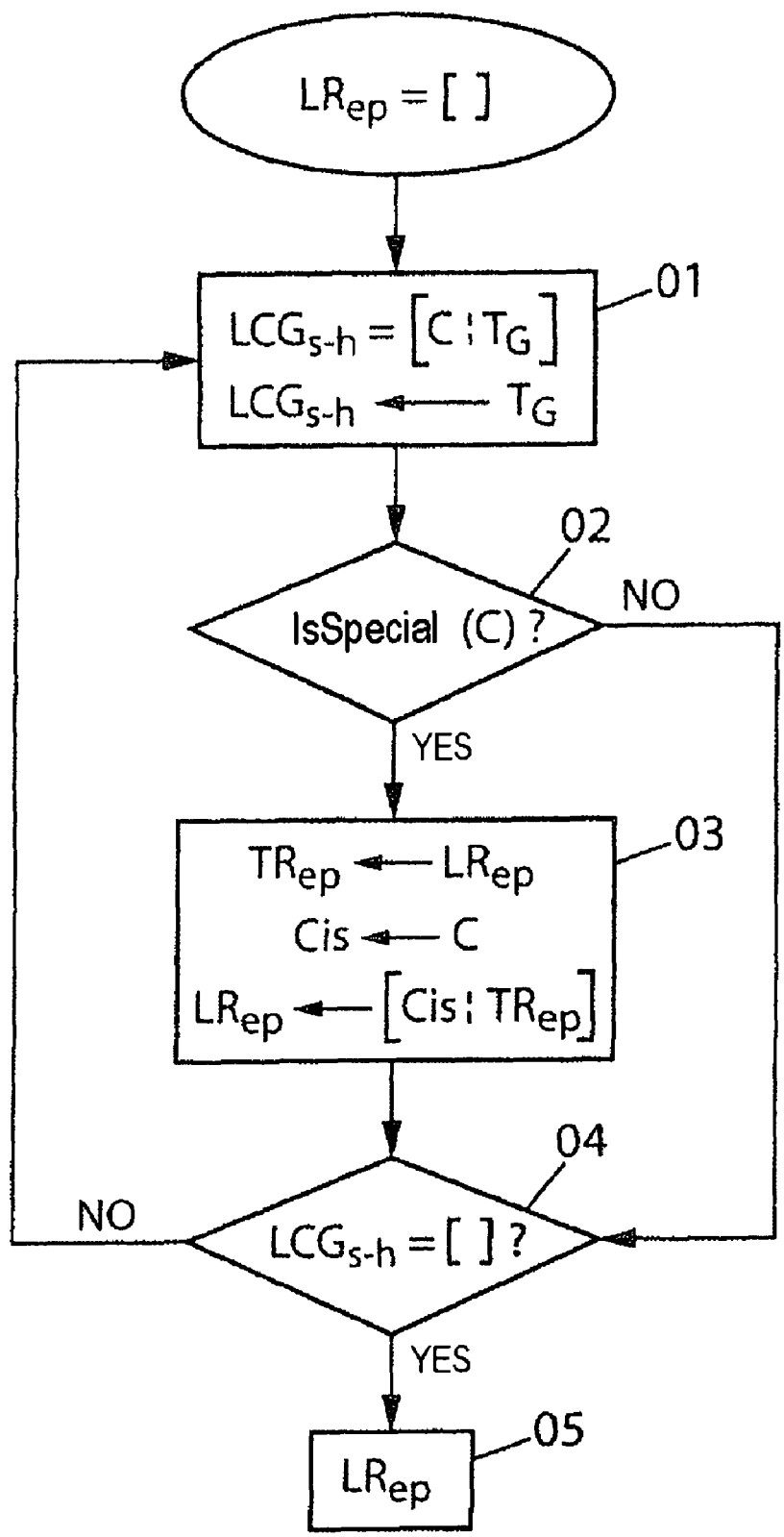
FIG. 3a1

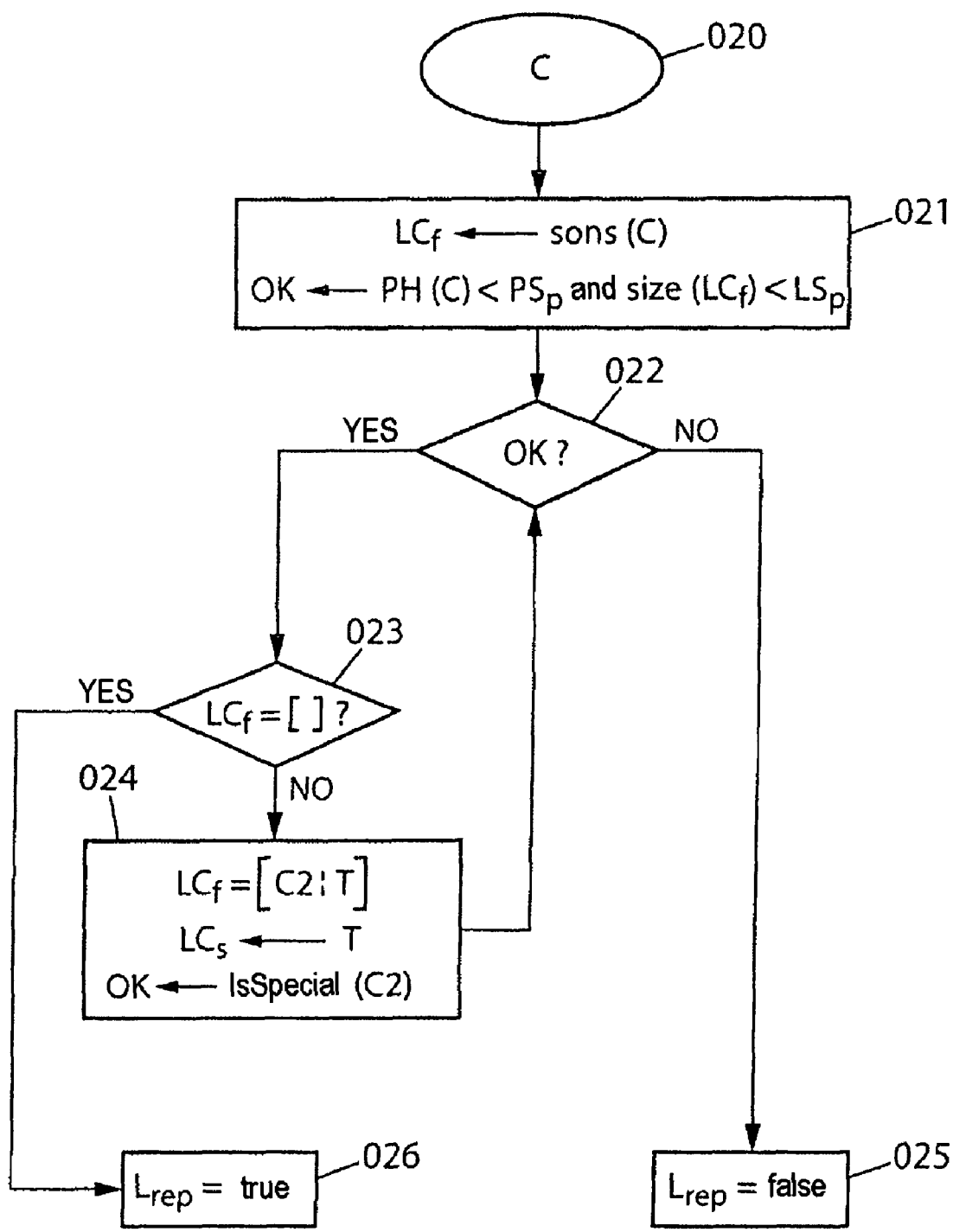
FIG. 3a2

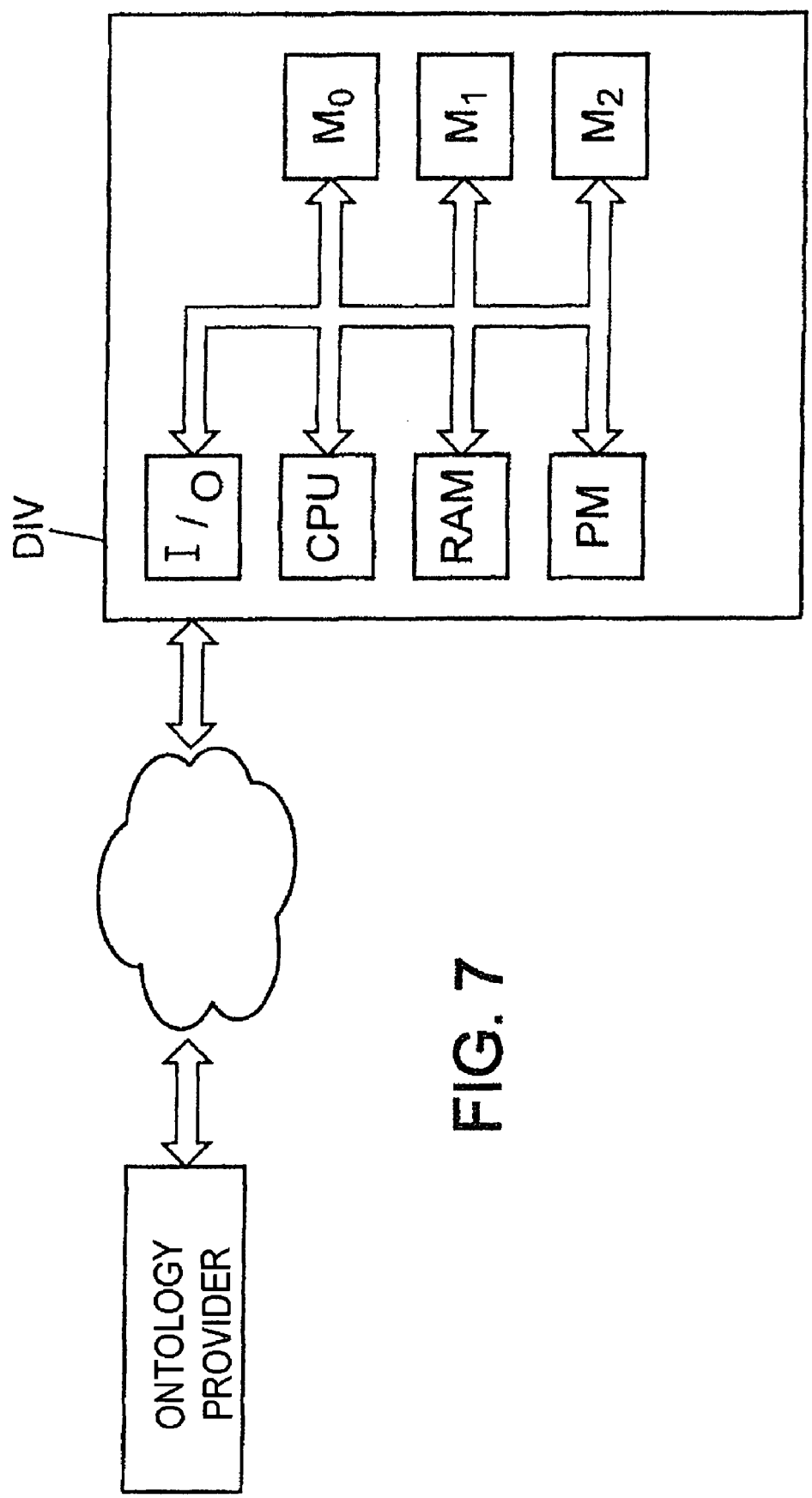

US 7,743,010 B2

METHOD AND DEVICE FOR ENCODING A SCORE OF SEMANTIC AND SPATIAL SIMILARITY BETWEEN CONCEPTS OF AN ONTOLOGY STORED IN HIERARCHICALLY NUMBERED TRELLIS FORM

This application claims priority from the French application FR 06 05541 filed Jun. 21, 2006 which is hereby incorporated by reference in its entirety.

BACKGROUND OF THE INVENTION

The invention relates to a method and a device for encoding a score of semantic and spatial similarity between concepts of an ontology stored in hierarchically numbered trellis form.

An ontology, in the context of the subject of the invention, should be understood to be a set of knowledge of facts and rules conveying information relating to an area of knowledge, of a technical and/or non-technical nature.

This information is translated by predicates, logical information-conveying entities, forming a relationship for at least one fact from the area of knowledge, the arguments of these predicates being able to be instantiated by particular values of these facts. A predicate (for example: Flight, and Country are two predicates useful in the area of knowledge of a traveller) can be instantiated by instances (example: 714/Sydney" is one instance of Flight, "France" an instance of Country).

Implicit information, obtained by saturating the knowledge areas of the ontology (rules, disjunctions, inclusions, definitions) can be calculated by a reasoner, defined for a language or a determined description logic, such as the ALN description logic which can be used to express object classes, concepts, based on constructors associated with the letters A: Top (universal concept), Bottom (empty concept), for All (universal restriction on certain properties associated with certain concepts) and Not; L: And (logical And between several concepts) and N: At least and At most (cardinality restriction on certain concepts).

A concept is a unary predicate, which accepts only one argument, with which it is possible to construct logic description formulae.

With reference to FIG. 1, an ontology of concepts can be represented in trellis form. A trellis is a partial order relation for which any pair of elements $(e_1, e_2)$ of the trellis has a higher element eS and a common lower element el ($e_1$<eS and $e_2$<eS; $e_1$>el and $e_2$>el). The order is said to be partial, because it is not defined for all the pairs of elements: with reference to the higher element eS=T, defined as the universal concept, and the lower element el=⊥, defined as the empty concept, certain elements in the direction of the abovementioned order relation are said to be smaller than others, B<C, but some elements are not comparable to others, B ? H or A ? F. An element or concept can have several higher and lower elements.

The abovementioned trellis structure is richer than a conventional tree structure, which does not allow an element or concept to have multiple parents.

An ontology which no longer contains implicit information is called a saturated ontology, in which any information is accessible in, at most, one forward linkage step. A forward linkage step or saturation step, consists in replacing, by rewriting, the left part of a rule, called condition or body, by its right part, called conclusion or head of the rule.

The exemplary trellis of concepts of FIG. 1a is described in description logic, as represented in the abovementioned figure, according to the relationship of order of subsumption, or generalization, between two concepts which comprises all the instances of the inclusion relation ⊆ between primitive concepts. This relation between two elements $e_1$ and $e_2$ is reduced for two primitive concepts to checking the existence of an instance of the inclusion relation $e_1 \subseteq e_2$ or $e_2 \subseteq e_1$. On the other hand, determining whether a defined concept generalizes another involves complex calculations on the description logic expressions.

Thus, with reference to FIG. 1,

A is the child of B and E–B is the parent of A and F–B, E, H, A, F and I are the descendents of C–B, E, C and D are the generalizers of A; T designates the universal concept; ⊥ designates the empty concept. The trellis represented in FIG. 1 incorporates two defined concepts H: =C∩G and I where H subsumes I. After these two adjunctions C, D and G subsume H and therefore I.

A process of calculating and encoding a score of semantic proximity between two concepts has been described in the thesis by Alain Bidault, Université de Paris-Sud, France, thesis entitled "Affinement de requêtes posées à un médiateur" (refining requests put to a mediator), order number 6932, July 2002.

Calculating and encoding such a proximity score is also facilitated by a process of completely numbering a trellis of concepts, which is the subject of the prior French patent application FR 05 07326 entitled "Procédé et système de codage sous forme d'un treillis d'une hièrarchie de concepts appartenant à une ontologie" (Method and system of encoding in trellis form a hierarchy of concepts belonging to an ontology), filed in the name of the applicant on Jul. 8, 2005, publicly accessible online at the Internet address:

http://priorart.ip.com/search.jsp?searchType=freetextSe arch, prior to the date of filing of the present patent application.

Such a numbering process was defined for concepts appearing in description logic in a trellis of concepts. The relationships of this trellis take the form Concept 1 ⊆ Concept 2 where the sign ⊆ designates the subsumption relation between two concepts. The empty concept ⊥ and the universal concept T do not appear explicitly in the hierarchy, but are assumed present as specializing and generalizing the most specialized concepts and the most general concepts.

The abovementioned numbering process is noteworthy in that it consists in assigning each concept an identifier consisting of one or more paths, each path consisting of a series of integers. Each path is unique on the trellis of concepts and corresponds to the existence of a succession of arcs oriented between the concept concerned and the universal concept T. T and ⊥ have no identifier.

A numbering of the trellis represented in FIG. 1 according to the abovementioned process is expressed:

D("1"); G("2"); C("11"); B("111"); E ("112"); A("1111", "1121"); F("1112", "1122"); H("21", "113"); I("211", "1131").

It can be seen in FIG. 1 that, for the concept A, there are two routes for reaching the universal concept:

ABCD and AECD, which justifies the presence of two paths in the identifier of the concept A, one route being defined as the course of a path.

A determined concept has characteristics, some of which are defined. The defined characteristics correspond to the occurrences or courses of the arcs forming a route between the determined concept concerned and the universal concept T. Each path of the identifier corresponds to a main component of the concept. The number of characteristics of a concept NC is linked to the depth Ph of the hierarchy and to the number K of paths (main components of its identifier), NC=K×Ph. The undefined characteristics are the other characteristics. The characteristics are taken into account globally over the whole of the identifier of the concept or for each of its paths taken separately.

In the example of FIG. 1, a hierarchy of depth Ph=4, the concept I("211", "1131") has K=2 main components, NC=2×4=8 characteristics, of which 3+4=7 are defined and 8−7=1 is undefined.

To proceed with calculating the paths, each node of the trellis representing a concept, the numbering process consists in assigning each node or concept an identifier, which inherits all the paths of its parents, to which, for example, the character or integer 1 for the first child of a parent node p is added to each of the paths of the parent nodes p, and so on for any successive child node of the parent node p.

The abovementioned numbering process is drawn from the topological sorting on an oriented graph. An oriented graph is a non-symmetrical binary relation in which each element of the relation is represented by a node in the graph and in which each occurrence of the relation R("n1", "n2") reveals, on the graph, an arc oriented from the node "$n_1$" to the node "$n_2$". The topology sorting algorithm makes it possible to apply a processing operation to a node once all its antecedents have been processed. By analogy, a concept of the trellis is numbered once all its parent concepts have been numbered. To keep the information relative to the hierarchy, a child concept $C_f$ inherits all the paths of the identifier of each of its parent concepts Cp extended to the right, for example, by a new character or integer number. The added character or integer number is the same for all the paths from one and the same parent to one of its children.

To guarantee that a path is associated with only a single concept of the hierarchy, the added character or integer is different for each of its children.

With reference to FIG. 1, the concept A has inherited the path "111" from its parent concept B and the path "112" from its parent concept E that it has extended with the character or integer 1, which could have been different depending on the rank of the child concept A for example. The set of the extended paths, obtained from all the parent concepts of the child concept $C_f$ constitutes the identifier of the latter.

Thus, it is possible to find:
- all the generalizers and the descendents of a determined concept by working through the identifier of this concept and the list of the concepts;
- the maximum and minimum numbers of arcs that separate each concept from the universal concept T and, consequently, its depth in the trellis.

The numbering process also makes it possible to easily perform a subsumption test between two concepts, even though a subsumption test is a complex calculation in an ontology described in description logic which makes it possible to determine whether the instances of a concept are included or not in those of another concept, by being based on the definition of the concepts. This test, facilitated in a saturated ontology, becomes very simple thanks to the numbering process.

In practice, with reference to FIG. 1, the concept C("11") subsumes the concept A("1111", "1121") because the path of the identifier of C is identified with, at least, one path of the identifier of A, here by prefixing one of the paths of the identifier of A.

The numbering process also makes it possible to determine their smallest common generalizers, ppcg. The set of common generalizers $\xi gc$ of two concepts $C_1$ and $C_2$ contains all the concepts which subsume both $C_1$ and $C_2$. ppcg is the greatest subset $d'=\xi gc$ ($\xi gc = ppcg \cup \xi_{remainder}$) such that no concept of the ppcg subsumes another concept of the ppcg and that no concept of the ppcg subsumes a concept of the remaining set $\xi_{remainder}$.

The ppcg of two concepts can be directly accessible in a saturated ontology and it is easy to extend the calculation of the ppcg from 2 to n concepts. The simplicity of the calculation of the ppcg based on the numbering is all the more appreciable.

With reference to FIG. 1, the ppcg of A("1111", "1121") and F("1112", "1122") is the set of the concepts associated with the paths "111" and "112", namely the concepts B and E.

The ppcg of the concepts A, F and H is restricted to the ppcg of ("111", "112") with ("21", "113"), namely the concept C("11"). However, the concepts D and G have no ppcg, apart from the universal concept T.

For a more detailed description of the above notions, reference can usefully be made to the abovementioned French patent application 05 07526.

The abovementioned numbering method also makes it possible to calculate and encode a score of semantic proximity between two concepts, as described in the abovementioned thesis by Alain Bidault.

The abovementioned encoded score is of interest only in a classification to order the concepts relative to a central or reference concept. The closer the concept is to the head of the classification obtained, the closer it is to the reference concept. To calculate and encode the abovementioned score, it is necessary to be able to determine, for two given concepts, the ppcg given by the common defined characteristics of the latter, and their separation in terms of numbers of arcs with respect to this ppcg.

With reference to FIG. 1, the concepts A("1111", "1112") and F("1112", "1122") are both at 2 times 1 arc from their ppcg ("111", "112").

The semantic convergence of two concepts favours the descendents, which have all the defined characteristics of their ancestors, orders these descendents according to their depth, the children are closer than the other descendents, and assigns a same score to the descendents located on the same stratum or level of descendence. In practice, a parent concept makes no distinction between its child concepts, just as a grandparent concept makes none with its child concepts, nor with its grandchild concepts, and so on.

The semantic convergence score of a concept $C_1$ centred on a concept $C_2$ is calculated in several phases which are detailed below:

1) determination of the common characteristics: a count is made of the number of defined characteristics of each path from the ppcg on each path of the central concept $C_2$. The paths of the concept $C_1$ are converged with the paths of the ppcg, so that they have a maximum number of common characteristics. The size of the common part is denoted $T_{pc}$.

2) each number of characteristics is enriched by the undefined characteristics of a path of the central concept $C_2$: in practice, by definition, the central concept $C_2$ has its undefined characteristics in common with each of its generalizers, therefore with the ppcg. This number is then standardized over the depth of the hierarchy to obtain a proximity ratio value PR:

$$(T_{pc}+P_h-|\text{path of } C_2|)/P_h = PR.$$

3) each defined characteristic of the concept $C_1$ absent from the ppcg is taken into account to penalize the proximity ratio PR, which makes it possible to take account of the separation from $C_1$ to the ppcg. The penalty value retained is 0.002. The proximity score on a path PN satisfies the relation:

$PN = PR - 0.002 |\text{other characteristics of } C_1|.$ 4) any proximity score on a negative path PN is considered as zero.
5) the semantic proximity score SPN is the average of the scores on a path $PN_i$: $SPN = \overline{PN_i}$.

With reference to the hierarchy of concepts represented in FIG. 1, of depth Ph=4, the semantic proximity score of the concept $C_1=A$("1111", "1121") centred on the concept $C_2=I$("211", "1311") is calculated below:

ppcg on "211"=T and ppcg on "1131"=C("11");
length of the common characteristics 0 and 2;
proximity ratios: PR1+(0+4−3)/4=1/4 and PR2=(2+4−4) 4=1/2;
scores on a path: PN1=¼−(0.002×4)=0.242 and PN2=1/2−0.002×2=0.496;
semantic proximity score of $C_1$ centred on $C_2$: SPN= (0.242+0.496)/2=0.369.

The semantic proximity score of each concept of the hierarchy of concepts represented in FIG. 1, centred on the concept I is given in the table T1 below.

TABLE T1

| | |
|---|---|
| I | Average (((3 + 4 − 3)/4) − 0, ((4 + 4 − 4)/4 − 0) = 1 |
| H | Average (((2 + 4 − 3)/4) − 0, ((3 + 4 − 4)/4 − 0) = 0.75 |
| C | Average (((0 + 4 − 3)/4) − 0.004, ((2 + 4 − 4)/4 − 0) = 0.373 |
| B | Average (((0 + 4 − 3)/4) − 0.006, ((2 + 4 − 4)/4 − 0.002) = 0.371 |
| E | Average (((0 + 4 − 3)/4) − 0.006, ((2 + 4 − 4)/4 − 0.002) = 0.371 |
| A | Average (((0 + 4 − 3)/4) − 0.008, ((2 + 4 − 4)/4 − 0.004) = 0.369 |
| F | Average (((0 + 4 − 3)/4) − 0.008, ((2 + 4 − 4)/4 − 0.004) = 0.369 |
| G | Average (((1 + 4 − 3)/4) − 0, 0 = 0.25 |
| D | Average (((0 + 4 − 3)/4) − 0.002, ((1 + 4 − 4)/4 − 0) = 0.249 |

The abovementioned semantic proximity score does not represent a distance, for example in number of arcs, between two concepts $C_1$ and $C_2$, because, to take account of the semantic constraints, the calculation of this score is not symmetrical but oriented to $C_1$ or $C_2$. For a more detailed explanation of this choice, reference can usefully be made to the abovementioned thesis.

The abovementioned numbering process does not give access to the other information of the ontology that can appear in a saturated version of the ontology. Thus, neither the exclusion constraints, nor the defined rules on the n-ary predicates, nor the typing constraints are taken into account.

Furthermore, there is currently no simple and cheap to implement way of calculating and encoding concept proximity scores that is representative both of the semantic proximity and of the spatial proximity of these concepts.

In the currently known techniques, the distance scores mainly favour the semantic aspect, which is very important for reasoning on a request, but they do not significantly take into account the spatial convergence of the concepts, within the graph of concepts, which is necessary for a better representation of the ontology. Calculating and encoding spatial distance scores currently entail expensive courses through the various concepts of the ontology.

SUMMARY OF THE INVENTION

The object of the present invention is to implement a method of calculating and encoding a score of semantic and spatial similarity between concepts of an ontology.

According to one noteworthy aspect, the method that is the subject of the invention is implemented based on an ontology stored in hierarchically numbered trellis form, involving a certain number of adaptations of the calculations and the encoding of the semantic distance scores.

In particular, the object of the invention is to implement a method of calculating and encoding a score of semantic and spatial similarity of concepts of an ontology, making it possible, in a particularly advantageous manner, to calculate and encode a semantic and spatial similarity score by convergence relative to their known semantic characteristics, respectively by separation according to their spatial distance for each concept with respect to a central concept, taken two-by-two.

Another object of the present invention is to implement a method of calculating and encoding a score of semantic and spatial similarity of concepts of an ontology making it possible to converge two concepts of that ontology, represented by a hierarchy of concepts, by giving a vision that is both semantic and spatial of the entire hierarchy, not only taking account of the direction of the concept but also the location of the latter in the hierarchy of concepts.

Another object of the invention is to implement a method of calculating and encoding a score of semantic and spatial similarity of concepts of an ontology making it possible also, prior to the step consisting in calculating a semantic and spatial similarity score, to discriminate within the hierarchy of concepts at least one special subhierarchy. The hierarchy of concepts is then subdivided into a first subhierarchy of concepts containing at least one special subhierarchy and into a second subhierarchy of concepts containing the other concepts of the hierarchy of concepts not belonging to the first subhierarchy, given the fact that each concept belongs, respectively does not belong, to this special subhierarchy, defined as an anchored subset concepts, of which the most general is the concept C which must respect two criteria, namely that the number of child concepts of C and the depth of C is less than a threshold value and such that each child of C also respects these two criteria.

According to the method that is the subject of the invention, a special subhierarchy is defined as a subhierarchy of the hierarchy of concepts, of which the depth of each of the concepts is less than a determined maximum special subhierarchy depth value and of which the number of child concepts for each of these concepts is less than a determined maximum special subhierarchy width value.

According to another particularly noteworthy aspect of implementation of the method that is the subject of the invention, the step consisting in discriminating, in the hierarchy of concepts, at least one special subhierarchy, includes at least one renumbering of the concepts, this renumbering consisting in prefixing any identifier of a concept belonging to a special subhierarchy with the smallest positive integer number not yet assigned to the concepts of the hierarchy of concepts.

According to another noteworthy aspect of the method that is the subject of the invention, the step for calculating and encoding a semantic and spatial similarity score includes at least one step consisting in calculating and encoding a score of similarity of a concept with respect to a central concept according to the known semantic characteristics of the latter and by separating this concept with respect to this central concept by a number of specialization steps with respect to the general concept common to the latter, by assigning a penalty value, dependent on the depth of the hierarchy of concepts.

According to another noteworthy aspect of the method that is the subject of the invention, the step for calculating and encoding a semantic and spatial similarity score also includes a step consisting in discarding from the set of the concepts of the hierarchy of concepts any concept belonging to a special subhierarchy forming the first subhierarchy of concepts.

Preferably, in a preferred optimized implementation, the semantic and spatial similarity score is a standardized value between 0 and 1, defined as the average for each path of the proximity ratio reduced by the product of the value of the penalty and the number of other defined characteristics of this concept and increased by the maximum penalty, product of the depth of the hierarchy of concepts and the value of the penalty.

The method that is the subject of the invention is finally noteworthy in that it consists in taking account of any concept of which all or part of the paths of the identifier of this concept belongs to at least one special subhierarchy.

The invention also covers a device for calculating and encoding a score of semantic and spatial similarity between concepts of an ontology stored in hierarchically numbered trellis form, noteworthy in that this device comprises at least means of calculating and encoding a semantic and spatial similarity score by convergence relative to their common semantic characteristics respectively by separation according to their spatial distance for each concept with respect to a central concept, taken two-by-two.

The device for calculating and encoding a score of semantic and spatial similarity that is the subject of the invention is also noteworthy in that it also comprises means of discriminating special subhierarchies, of which the depth of each of the concepts is less than a determined maximum special subhierarchy depth value and of which the number of child concepts for one of each of these concepts is less than a determined maximum special subhierarchy width value, and means of renumbering the concepts, this renumbering consisting in prefixing any identifier of a concept belonging to a special subhierarchy by the smallest positive integer number not yet assigned to the concepts of the hierarchy of concepts.

The device for calculating and encoding a semantic and spatial similarity score that is the subject of the invention can advantageously be adapted to implement the abovementioned method of calculating and encoding a semantic and spatial similarity score.

The method and the device that are the subjects of the invention are applicable to the management and consultation of ontologies stored in hierarchically numbered trellis form, in the most varied professional or application domains.

BRIEF DESCRIPTION OF THE DRAWINGS

They will be better understood from reading the description and consulting the drawings below in which, apart from FIG. 1 relating to the prior art, FIG. 2a illustratively represents a flow diagram of implementation of the method that is the subject of the invention.

Figure 1:
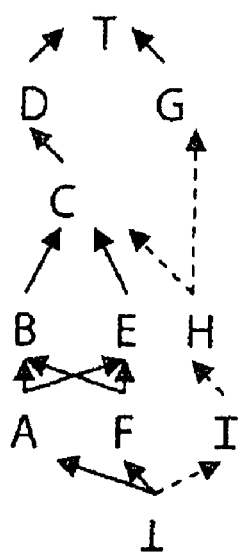
Figure 6:
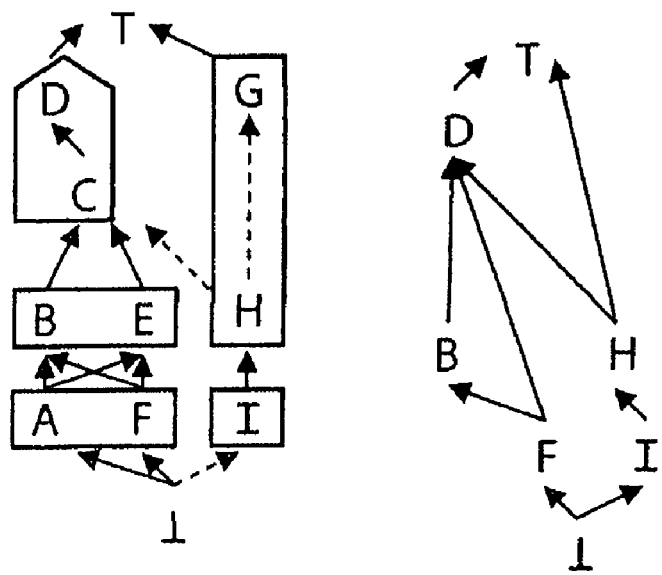
Figure 3B:
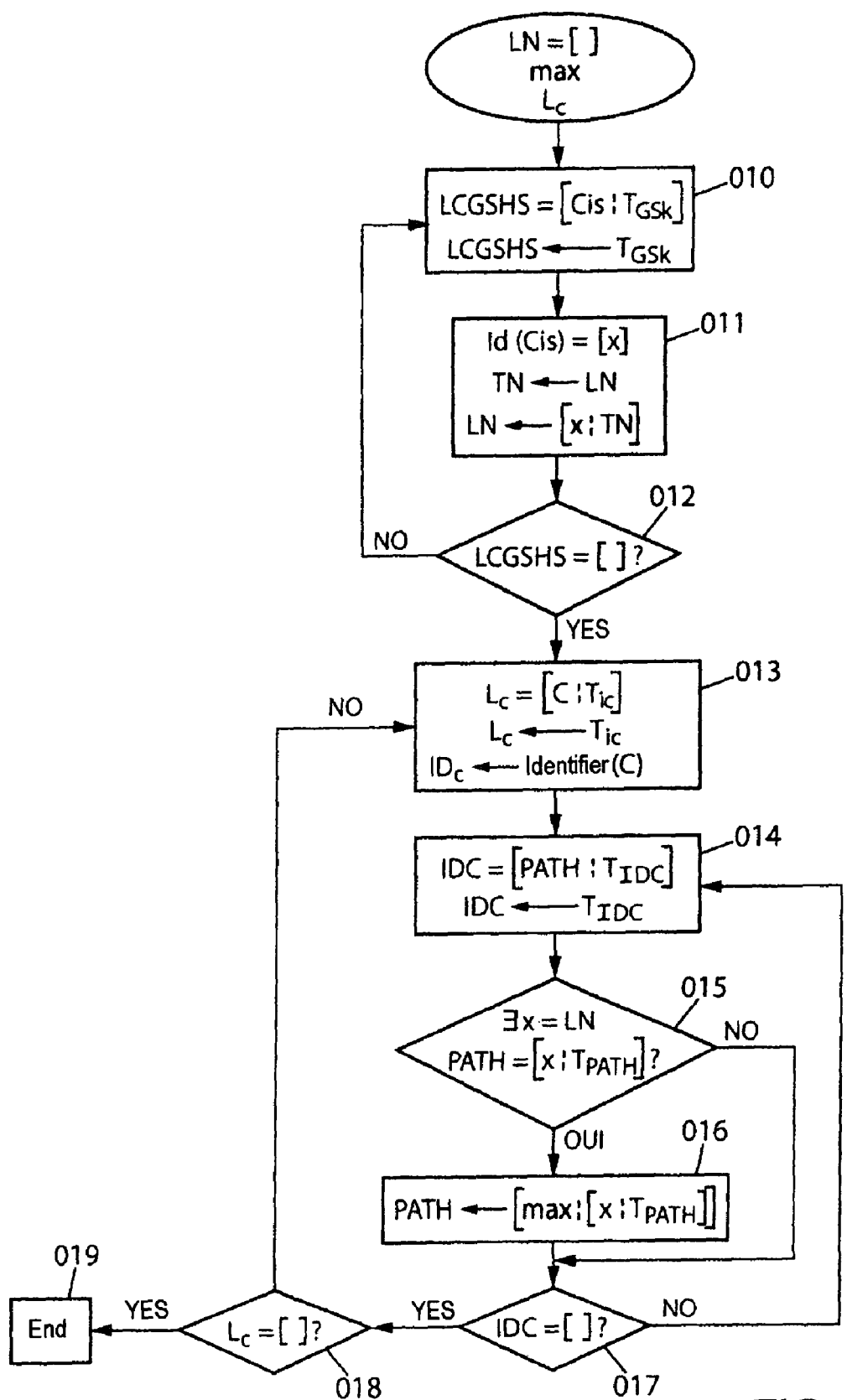
Figure 4A:
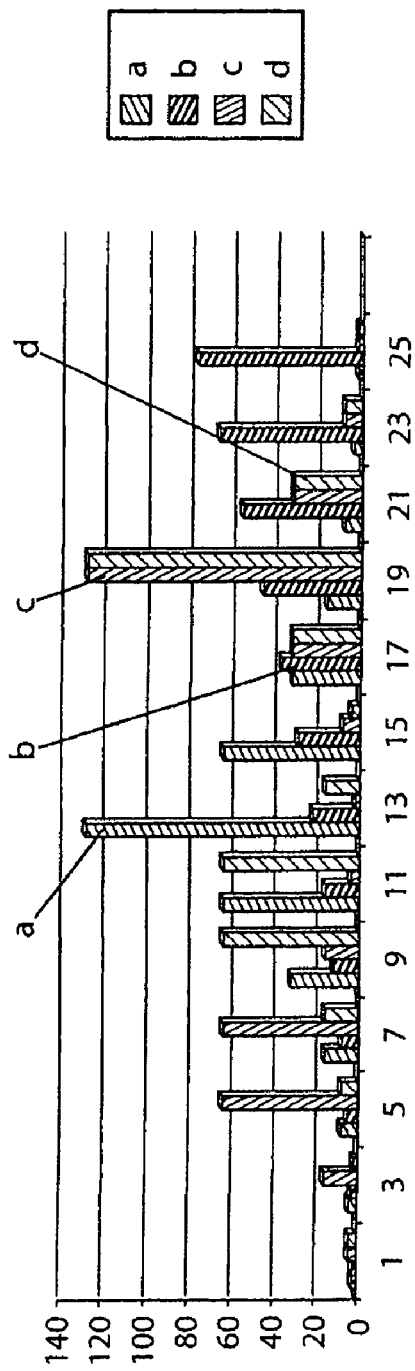
Figure 4B:
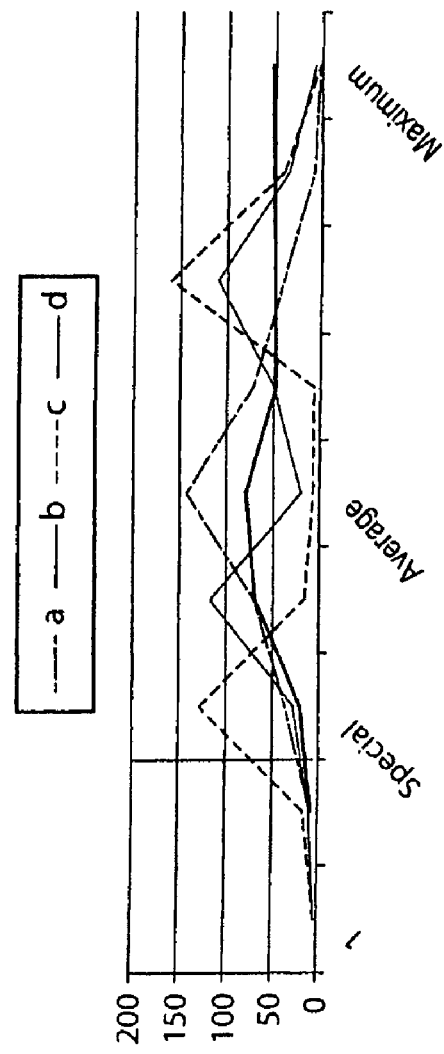
Figure 5:
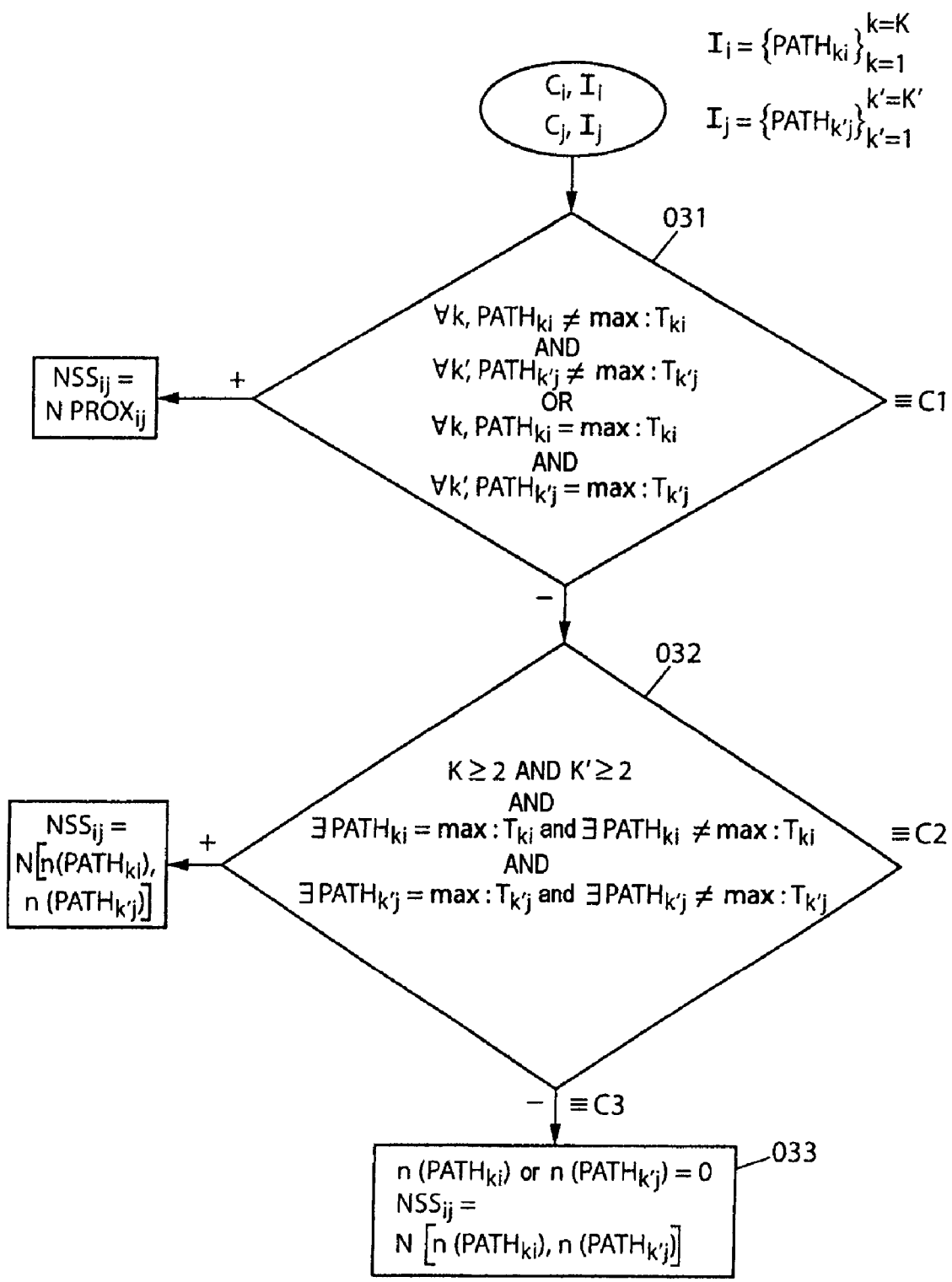

FIG. $3a_1$ illustratively represents a flow diagram of a method of discriminating special subhierarchies in a hierarchy of concepts, a special subhierarchy being of little semantic interest, even no interest at all;

FIG. $3a_2$ illustratively represents a test flow diagram applicable to any concept, in order to determine the special character of the latter;

FIG. 3b illustratively represents a flow diagram of a general process of renumbering the paths and identifiers of the concepts belonging to a special subhierarchy, by a marking by insertion of a prefix specific to any path of a concept belonging to a special hierarchy;

FIGS. 4a and 4b illustratively represent concept distribution curves, respectively of average value for bell distributions, increasing, or in camel-back form, for a hierarchy of concepts of maximum depth 25;

FIG. 5 represents a flow diagram of calculation of a general score between two concepts, whatever the origins of their paths, belonging or not belonging to a special subhierarchy;

FIG. 6 represents an illustrative diagram of a simplified representation of the hierarchy of concepts of the prior art represented in FIG. 1, by implementation of the method that is the subject of the invention;

FIG. 7 represents a device for calculating and encoding a score of semantic and spatial similarity between a concept and a reference concept of a hierarchy of concepts.

DESCRIPTION OF PREFERRED EMBODIMENTS

A more detailed description of the method of encoding a score of semantic and spatial similarity between concepts of an ontology stored in hierarchically numbered trellis form according to the subject of the present invention will now be given in conjunction with FIG. 2a, FIG. 2b and the subsequent figures.

As a general rule it is indicated that the method that is the subject of the present invention can be implemented from any ontology stored in hierarchically numbered trellis form as represented in FIG. 1, each concept $C_i$ being associated with the identifier $I_i$ comprising several paths, each path being formed by a series of integers or characters, as described in conjunction with FIG. 1.

More generally, it is of course understood that the method that is the subject of the present invention can be executed either from the data structure represented in FIG. 1, on the pairings of concept $C_i$ and identifier $I_i$, or, on the contrary, following the implementation of a method of encoding by numbering the concepts of an ontology and of any trellis according to the method described in the prior French patent application FR 05 07326 filed on Jul. 8, 2005 mentioned previously in the description.

Thus, the method that is the subject of the invention is implemented on a numbered trellis, the paths of each identifier $I_i$ corresponding to a succession of arcs oriented between the concept concerned $C_i$ to which is allocated at least one path, and the universal concept T to form a hierarchy of concepts under the universal concept. Each path associated with the concept $C_i$ thus defines a route via successive parent, respectively child, concepts to reach the concept $C_i$ concerned.

The method that is the subject of the invention is therefore implemented on a hierarchy of concepts denoted:

$$H_c\{C_i, I_1\}_{i=1}^{i=i\ max}.$$

Figure 2A:
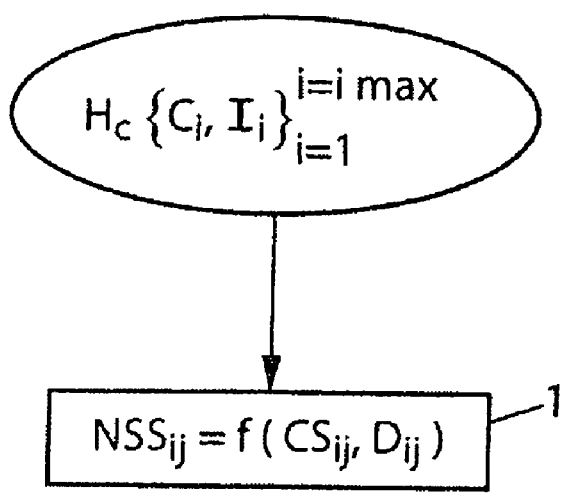
FIG. 2b illustratively represents a flow diagram of a preferred implementation of the method that is the subject of the invention in which, prior to a step for calculating and encoding the score of semantic and spatial similarity between concepts taken two-by-two, special subhierarchies are discriminated, in order either to discard the latter before executing the calculation of the score of semantic and spatial similarity between concepts, or to execute a specific semantic and spatial similarity score calculation.

As is represented in FIG. 2a, the method that is the subject of the invention consists, in a step 1, in calculating and encoding a semantic and spatial similarity score denoted $NSS_{ij}$, this score being calculated by convergence relative to their common semantic characteristics, these characteristics being denoted $CS_{ij}$, respectively by separation according to the spatial distance denoted $D_{ij}$, for each concept $C_i$ with respect to a central concept or so-called reference concept $C_j$, the concept concerned $C_i$ and the reference concept $C_j$ being taken two-by-two.

Consequently, the semantic and spatial similarity score $NSS_{ij}$ satisfies the relation 1:

$$NSS_{ij}=f(CS_{ij},D_{ij}).$$

In the above relation:
$CS_{ij}$ designates the common semantic characteristics between the concept $C_i$ and the reference concept $C_j$;
$D_{ij}$ designates the spatial distance between the concept $C_i$ and the central concept $C_j$;
i and j respectively indicate the addresses of the concept $C_i$ and of the central concept $C_j$, these concepts naturally being identified by their identifier and their paths.

It is indicated that, specifically, the notion of semantic convergence can be effected by calculating paths of the same prefix, which makes it possible to obtain common defined characteristics of each of the concepts concerned, that is the concept $C_i$ and the central concept $C_j$, and so evaluate the common points between the different concepts. These common defined characteristics correspond to semantic characteristics with respect to a common ancestor, designated root concept on an entire hierarchy of concepts.

In addition to the abovementioned semantic aspect, one or more concepts of a hierarchy of concepts, encoded according to the subject of the present invention, present a spatial aspect, that is, a notion of separation with respect to a common ancestor.

The spatial aspect of a hierarchy of concepts according to the method that is the subject of the invention then makes it possible to take account of the separation of any concept concerned $C_i$ with respect to one or more common ancestors.

The notion of spatial spacing or separation thus makes it possible to take account of the general form of the hierarchy and, ultimately, the physical form of the hierarchically numbered trellis.

It will be recalled, in particular, that the abovementioned general physical form is linked to the hierarchical organization of the subsumption relation symbolized by the arcs linking each concept, as represented in FIG. 1.

The implementation of the method that is the subject of the present invention, as represented in FIG. 2a, can be carried out generally on any ontology and, in particular, any ontology stored in hierarchically numbered trellis form, as mentioned previously in the description.

However, such a procedure makes it possible to obtain only one sub-optimal representation of the abovementioned ontology, because of the presence of special subhierarchies in this ontology, these special subhierarchies being formed by branches, successions of arcs and of concepts or nodes $C_i$, possibly in large numbers but the semantic value of which is of little interest, even of substantially zero interest, relative to the domain described elsewhere.

The notion of substantially zero interest is understood, for example, from the representation of the ontology and of the use of the latter, that is, the use of the hierarchically numbered trellis in concrete cases, such as, for example, for a description of the tourism domain, the existence of concepts specifying the colours for qualifying, for example, the buses of the urban transport network in the city of Sydney.

The method that is the subject of the present invention then makes it possible to disregard the existence of such subhierarchies, called special subhierarchies, either by discarding the latter or, on the contrary, by adapting the encoding and therefore the representation of the latter for the purpose of optimizing the data structure and the access to this data structure forming the hierarchically numbered trellis representing this ontology.

Figure 2B:
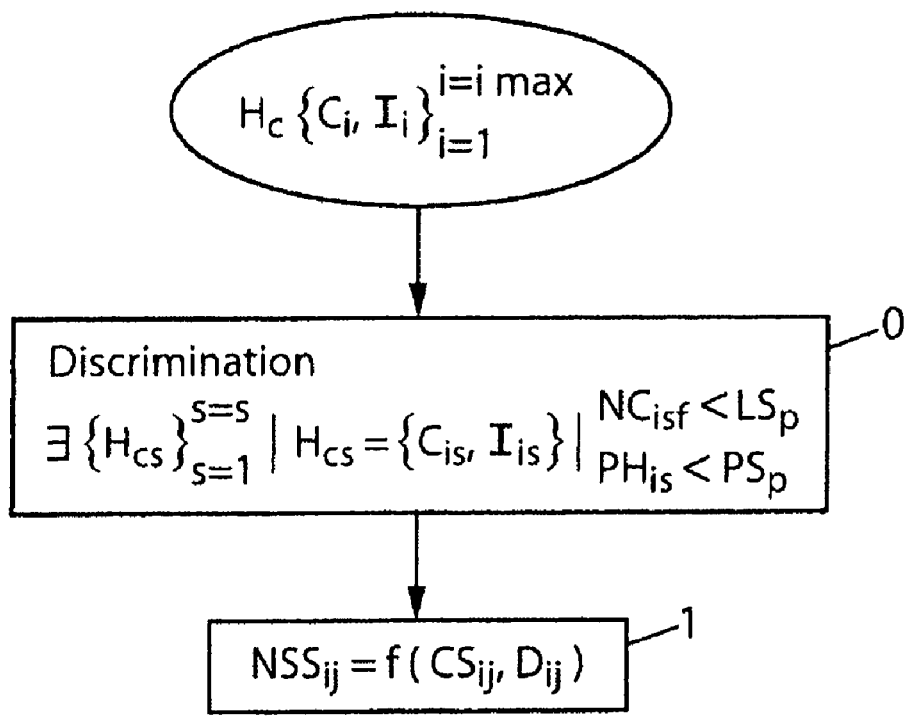

The method that is the subject of the present invention, in its optimized form, then advantageously consists, as represented in FIG. 2b, in performing, prior to the step consisting in calculating a semantic and spatial similarity score, step 1 described previously, in discriminating, in a step 0, in the hierarchy of concepts $H_c$, at least one special subhierarchy, defined previously.

In the step 0 of FIG. 2b, the discrimination step, the discrimination operation proper is denoted by the relation 2:

$$\exists \{H_{cs}\}_{s=1}^{s=S} \Big| H_{cs} = \{C_{is}, I_{is}\} \Big|_{PH_{isf}<PS_p}^{NC_{isf}<LS_p}.$$

In the above relation 2:
$H_{cs}$ indicates a special subhierarchy of concepts, a plurality of 1 to S of the latter being able to be discriminated;
$C_{is}, I_{is}$ designates each concept and the identifier associated with this concept belonging to the special subhierarchy concerned;
$NC_{isf}$ indicates the number of child concepts for the special hierarchy concerned;
$LS_p$ designates the maximum width of the special hierarchy $H_{cs}$ concerned;
$PH_{isf}$ designates the depth of the descendent concepts of the most general concepts of the special hierarchy;
$PS_p$ designates the maximum depth of the special hierarchy concerned.

It will thus be understood that, thanks to the implementation of the step 0 for discriminating one or more special subhierarchies, the original hierarchy of concepts $H_c$, is then subdivided into a first subhierarchy of concepts containing any special subhierarchies $H_{cs}$ and into a second subhierarchy of concepts containing the other concepts of the hierarchy of concepts not belonging to the abovementioned first.

It will thus be understood that the operation for discriminating one or more special subhierarchies then makes it possible either to discard these subhierarchies whose interest from the ontological point of view is not necessarily justified, or, on the contrary, to perform a specific processing operation on the latter in order to optimize the encoding of the ontology.

A more detailed description of the implementation of the abovementioned discrimination step will now be given in conjunction with FIGS. $3a_1$ to $3b$ based on specific examples.

Several specifics of the hierarchy of concepts must be taken into account for calculating the proximity score:
there are special subhierarchies of T that do not a priori have to be converged with other subhierarchies, or even between themselves. They need to be subjected to a special processing operation;
all the branches of the hierarchy do not have the same size or the same depth.

The special subhierarchies $H_{cs}$ are small subhierarchies which do not contain many concepts. They make it possible to perform a description of small subdomains linked to the general domain but which do not have to be described exhaustively or which contain only very few concepts.

For example: if the general domain is that of books, the subhierarchies devoted to the Booleans (yes/no/true/false) or other conventional types are of no interest in obtaining a semantic and spatial overview of the general domain.

The special subhierarchies of the initial set of concepts can then be discarded, because they will not ultimately be taken into account in calculating the score $NSS_{ij}$. A special subhierarchy is a subhierarchy of $H_c$ located under T, of which the depth of each of its concepts is less than the value $PS_p$ indicating the maximum depth of a special hierarchy and of which the number of children for one and the same concept is less than the value $LS_p$ which describes the maximum width of a special hierarchy. There can be many uses of these small hierarchies, but not within the context of the present patent application.

The threshold value $PS_p$ can be set at $PS_p$=average of the depths of the concepts of the entire ontology divided by two and the threshold value $LS_p$ can be set to $LS_p$=average of the widths of the concepts of the entire ontology divided by two.

For example: the sum of the depths of the concepts of the example of FIG. 1 is 25: A (4) B (3) C (2) D (1) E (3) F (4) G (1) H (3) I (4). The average for the 9 concepts is 2.77, or $PS_p$=1.39. The concepts of the subhierarchy D are located at a depth of more than 1.39, D apart, and the same goes for the subhierarchy G. There is no subhierarchy to be discarded. It is possible, however, by way of illustration, to take into account the average of the widths of the concepts divided by two. There are 15 arcs in all in this hierarchy of concepts $H_c$, or an average of 0.83. Since this figure is less than 1, for this hierarchy and in this very specific example of FIG. 1, nor is it possible to associate with it the least subhierarchy, each concept having at least one arc to a child concept, this child concept being ⊥ for the most specialized concepts.

A more detailed description of a specific general process of detecting special subhierarchies will now be given in conjunction with FIGS. 3a$_1$ and 3a$_2$.

The process of detecting one or more special subhierarchies is implemented based on a list denoted list=$LCG_{s-h}$, comprising the list of the most general concepts that begin a subhierarchy, the threshold value $LS_p$, the threshold value $PS_p$ and a list of responses denoted $LR_{ep}$ initialized to an empty value denoted $LR_{ep}$=[].

With reference to FIG. 3a$_1$, the discrimination process consists, in a step 01, in reading, that is working through, the concept elements of the list $LCG_{s-h}$ denoted:

$$LCG_{s-h}=[C|T_G]$$

$$LCG_{s-h} \leftarrow T_G.$$

The above notation indicates that the list $LCG_{s-h}$ is formed by a general concept element C beginning a head subhierarchy C and a list tail $T_G$ comprising a plurality of these most general concepts each beginning a subhierarchy.

Then, the list $LCG_{s-h}$ is assigned the list tail value $T_G$. It is indicated that throughout the description the left-pointing arrow symbol ← represents the assignment operation.

The step 01 is followed by a step 02, consisting for any concept (C) belonging to the list of child concepts $LCG_{s-h}$, in performing a so-called speciality test of the concept (C) by applying the logical relation 3:

Is special (C)?

In the abovementioned relation 3, on a negative response to the test 02, a test step 04 $LCG_{s-h}$=[]? is called for passage to the next concept (C) in the list $LCG_{s-h}$ by return to the abovementioned step 01.

On the contrary, on a positive response to the test 02, in the step 03 the concept C is assigned the special character according to the relation 4:

$$C=\{C_{is}, PS_p, LS_p\}.$$

In the relation 4, $C_{is}$ designates the special character of the concept C=$C_{is}$ for the threshold values $PS_p$ and $LS_p$.

The step 03 comprises a substep consisting in concatenating the special concept $C_{is}$, that is, ultimately the current concept C, with the list of responses and, in particular, with the list tail $TR_{ep}$ according to the relation 5:

$$LR_{ep} \leftarrow [C_{is}|TR_{ep}].$$

The assignment process by concatenation of a special concept executed in the step 03 is continued as long as the list of child concepts is not empty, this operation being represented by a return from the step 04 to the step 01 for calling the next concept C.

The entire process is continued as long as the list of the most general concepts that begin a subhierarchy, that is the list $LCG_{s-h}$, is not empty, this operation being represented in the FIG. 3a$_1$ by the test 04 according to the relation 6 of FIG. 3a$_1$:

$$LCG_{s-h}=[]?$$

The negative response to the test 04 is followed by a return to the step 01, that is, transition to the list element formed by the next concept C, the most general concept that begins the subhierarchy, by reading the list tail $T_G$.

On the contrary, on a positive response to the test 04, there is a response list $LR_{ep}$, which naturally comprises all the concept elements $C_{is}$ to which the special character has been assigned.

The execution of the "IsSpecial" function applicable to any most general concept C in the test 02 of FIG. 3a$_1$ will now be described in conjunction with FIG. 3a$_2$. From any concept C belonging to the list $LCG_{s-h}$ read in the step 01 of FIG. 3a$_1$ and in the step 020 of FIG. 3a$_2$, in a step 021, the list of child concepts of C is determined, denoted $LC_f$←sons(C) and the special character of the concept C is discriminated according to the relation 5:

$$LC_f \leftarrow sons(C)$$

$$OK \leftarrow Ph(C) < PS_p ET\ size(LC_f) < LS_p.$$

The logical value of the OK response is evaluated in the step 022, OK?

On a negative response to the step 022, in the step 025, there is a negative response to the step 02 of FIG. 3a$_1$, denoted $L_{rep}$=false.

On the contrary, on a positive response to the test 022, a test 023 $LC_f$=[]? is called. If, in positive response to the test 023, the list $LC_f$ of the child concepts of C is empty, the hierarchy for which the concept C is the most general concept is a special hierarchy, the response list $L_{rep}$ being validated with the value true in the step 026.

On the contrary, on a negative response to the test 023, the list of the child concepts $LC_f$ of the most general concept C not being empty, a recursive "IsSpecial" function call is applied to the first concept $C_2$ of the list $LC_f$ of the child concepts of C in the step 024, and, recursively, on all the concepts of this list as far as empty list $LC_f$=[] by return to the test 022.

The process illustrated by the flow diagrams of FIGS. 3a$_1$ and 3a$_2$ can, of course, advantageously be implemented using a computer program, the pseudo-code of which is given below.

General algorithm for detecting special subhierarchies:
list←List of the most general concepts that begin a subhierarchy;
PSpecial←average of the depths of the concepts divided by two;
LSpecial←average of the widths of the concepts, divided by two;
Response←Empty_List;
Work through the list concept elements;
    If (isSpecial(concept, PSpecial, LSpecial)) then
    Response←Response.add(concept);
EndBrowse;
Return to Response
IsSpecial algorithm (concept, PSpecial, LSpecial):
list←list of children (concept)
OK←depth(concept)<PSpecial AND
size(list)<LSpecial
While OK and ExistsNextConcept(list)do
    C←nextconcept(list)
    OK←isSpecial(C,PSpecial,LSpecial)
EndWhile
Return OK In the above pseudo-code, only the literal designations of the elements of FIGS. $3a_1$ and $3a_2$ are represented.

For the purpose of easily identifying the abovementioned special subhierarchies, and applying to them a subsequent specific processing operation, according to the method that is the subject of the present invention, in order to facilitate the calculation and encoding of the scores of semantic and spatial similarities between concepts, the method that is the subject of the invention can then advantageously consist in performing a renumbering, in order to mark, by inserting a prefix, certain paths of the hierarchy of concepts, that is, paths of concepts belonging to a special subhierarchy.

It will be understood, in particular, that this operation then makes it possible to easily discriminate by simple working through the paths concerned, any concept $C_{is}$ belonging to a special hierarchy in order to apply to the latter, or ultimately to any subset of concepts of a special subhierarchy, a specific processing operation.

To this end, the first property of the renumbering will be used as a starting point: an identifier is unique to any concept of the hierarchy. The method that is the subject of the invention then consists in simply prefixing the identifiers of these special subhierarchies by the smallest positive integer number that has not yet been assigned in the renumbering. Thus, the identifier of a concept, after renumbering, makes it possible to directly determine, for each of its paths, whether the latter belongs or does not belong to a special subhierarchy.

Example: to prefix certain concepts of the ontology represented in FIG. 1, the number 3 being the largest number assigned, all the paths of this subhierarchy are prefixed by the number max=4. By now considering another hierarchy with a special subhierarchy under the concept P("3") with max=9 and the following descendents of P: P2("31") P3("32") P4("311", "42"), the renumbering by introduction of a prefix assigns the following numbers: P("93"), P2("931") P3("932") P4("42", "9311").

A general description of the renumbering process will now be given in conjunction with FIG. 3b.

With reference to FIG. 3b, it is indicated that the general renumbering process is applied to a list denoted list=LCGSHS, comprising the list of the most general concepts that begin a special subhierarchy. This list can be established from the response list $LR_{ep}$ obtained previously in the step 05 of FIG. $3a_1$.

The renumbering process is also implemented from the numerical value max, the smallest positive integer number that has not yet been assigned on the renumbering of the encoded trellis.

The renumbering process is finally implemented from a root of the hierarchy of concepts, root denoted r, of the list of the concepts $L_c=LC_i$ list of the concepts of the hierarchy of concepts, and a list of prefixes sought for the concepts $C_{is}$ belonging to a special subhierarchy, this list being denoted LN and instantiated with the empty list value [] on starting the implementation of the renumbering process.

With reference to FIG. 3b, the renumbering process then comprises a step 010 consisting in working through the list LCGSHS of the most general concepts that begin a special subhierarchy for each concept element belonging to this list.

The operation executed in the step 010 consisting in a reading of the list LCGSHS is represented by the relation 7:

$$LCGSHS=[C_{is}|T_{GSk}].$$

In the abovementioned relation 7, $C_{is}$ designates the most general concept list element that begins a special subhierarchy. This element makes it possible in the step 011 to determine the identifier of the latter denoted $I_d(C_{is})$, where x designates the prefix limited to an integer representative of the path of this element from the root element r, then, successively, x thus designating the integer representative of the concept $C_{is}$ with respect to the parent concept of the latter. $T_{GSk}$ designates the list tail.

The step 011 also consists in adding to the starting list LN the value of the integer x representative of the path of the most general concept $C_{is}$ by concatenation with the list tail value TN of the list LN according to the relation 8:

$$TN \leftarrow LN$$

$$LN \leftarrow [x|TN]$$

By the abovementioned operation, according to the relation 8, it will be understood that there is added to the list LN, list of prefixes sought bearing in mind that this prefix is limited to an integer with respect to the parent concept of the latter, the path x of the identifier of the concept $C_{is}$ concerned.

The step 011 is then followed by a test step 012 for verifying the existence of another general concept beginning a special subhierarchy in the list LCGSHS. This operation is represented by the relation 9:

$$LCGSHS=[]?$$

On a negative response, a return to the step 010 is called for return to the working through of $T_{GSk}$ in the step 010.

On the contrary, on a positive response to the test 012, a step 014 is called in which there is a complete list LN, list of prefixes sought for the concepts belonging to a special subhierarchy. This list corresponds to the list of the successive integers or prefixes of the successive integers bearing in mind that the prefix is limited to the corresponding integer.

The renumbering process proper for the concepts can then be executed as represented in FIG. 3b from the root node r, that is the universal concept, from the smallest positive integer number value max that has not yet been assigned on renumbering of the encoded trellis and from the list LN obtained previously.

With reference to the abovementioned figure, the renumbering process consists in a step 013 in browsing through the list of the concepts of the original hierarchy of concepts, that is, the list $L_c=[C|T_{ic}]$, each concept C obviously having associated with it an identifier $ID_c$ and the paths of the latter according to the relation $ID_c \leftarrow$Identifier(C).

The step 013 is then followed by a step 014 consisting in browsing through the abovementioned list of paths denoted IDC={PATH|TIDC} of the identifier $ID_c$, according to the relation IDC←$T_{IDC}$.

The step 014 is followed by a test step 015 consisting in verifying if all the path concerned, denoted PATH, of the identifier $ID_c$, path denoted IDC={PATH|$T_{IDC}$} is prefixed by the list value LN, list of the prefixes sought. It will be recalled that in this operation the list LN of the prefixes sought is considered one element at a time and is therefore reduced to an integer belonging to the list LN. The test executed in the step 015 verifies the relation 10:

$\exists X=LN$

PATH=[X|$T_{PATH}$]?.

On a positive response to the test 015, a step 016 is called which consists in inserting the value of the integer max as a prefix of the path PATH concerned. The corresponding operation is represented by the relation 11:

PATH←[max|[X|$T_{PATH}$]]. 6

It will be understood, in particular, that the abovementioned insertion can be done by concatenation of the corresponding list elements since max is an integer value added at the head of the list of the integers forming the path PATH.

The step 016 is followed by a step 017 consisting in detecting the end of the list IDC, list of paths of the concept C concerned. On negative response to the abovementioned test 017 IDC=[]?, a return to the step 014 for working through the list IDC is performed to continue the process.

On the contrary, on a positive response to the test 017, a test for detecting the end of the list of the concepts $L_c$ is executed in the step 018 according to the relation 13:

$L_c$=[]?

On a negative response to the test 018, a return to the step 013 is carried out to go on to the next concept C in the list of concepts $L_c$.

When the end of the list of the concepts $L_c$ is reached on a positive response to the test 018, there is at that moment in the step 019 a set of concepts belonging to one or more special hierarchies of which the paths have been renumbered by insertion of the prefix max into all the corresponding paths of these concepts.

Finally, on a negative response to the test 015, when the relation 10 has not been verified, the process is followed by a direct call to the step 016 to continue the process for the next path in the list of paths IDC.

Of course, the renumbering process represented in FIG. 3b and described previously is implemented by a computer program module, the pseudo-code of which is given below, with LN=ListN and $ID_c$=Id:

General renumbering algorithm:
list←list of the most general concepts that begin a special subhierarchy
max←smallest positive integer number that has not yet been assigned on renumbering
r←root node of the hierarchy
ListN←empty list
Work through the concept elements of list
    add to ListN the integer associated with the path of the identifier of concept
EndWorkThrough
RenumberConcepts(r, max, ListN)
    RenumberConcepts algorithm (r: root node, max: integer to be added, ListN: list of prefixes n sought):
    Concept←r.associatedconcept( );
    Id←Concept, associatedidentifier( );
    Work through path elements of path of Id
        If path,HasforPrefix(ListN) then
            path.Insert (max)
    EndWorkThrough
    list←list of nodes located under the root node r
    Work through the node elements of list
        RenumberConcepts(node,max,ListN)
    EndWorkThrough It is not, however, possible to detect the special subhierarchies and renumber them during the processing operation, since, to determine whether a leaf concept belongs to a special subhierarchy, it is essential to have worked through all of the subhierarchy located between the universal concept, this leaf and the other leaves of this same subhierarchy.

Thus, using the method that is the subject of the invention, it is possible to isolate a part of the paths of the hierarchy then to apply a specific processing operation to the isolated concepts associated with these paths of the identifiers to calculate the proximity score between a concept and one of these isolated concepts.

With reference to FIGS. 4a and 4b, it is possible to envisage 3 cases of distribution of the concepts (vertical) on the ontology according to their depth or their width (horizontal). The maximum depth on these three examples is 25. FIGS. 4a and 4b show a bell curve (with 30° chain dotted line hatching), increasing (b with thick hatching and thick lines) or in camel form (c in 120° dashed line hatching and d in 45° continuous line hatching):

The curve (a) offers an average of the concepts with 13 of depth or width. P/$LS_p$(a)=6.5. The curve (b) offers an average of the concepts with 19.06 of depth or width. P/$LS_p$(b)=9.53. The curve (c) offers an average of the concepts with 13.08 of depth or width. P/$LS_p$(c)=6.54. The curve (d) offers an average of the concepts with 14.71 of depth or width. P/$LS_p$(d)=7.36. From these values, four curves are obtained which present on the vertical the number of concepts according to their distribution over the special depth or width, average or maximum. It will be noted that the horizontal axis does not have a regular scale with respect to the depth or the width of the concepts. In practice, the averages for the four curves are different, as are the values P/$LS_p$ and yet these values are represented in the same position on the diagram for the four curves.

For the curves (a) and (c), the averages being 13, the horizontal axis remains with constant steps. However, for the curve (b) and respectively the curve (d), the average being 19 (respectively 14.7), the three values corresponding to the depths 21, 23 and 25 (respectively six values between 15 and 25) are smoothed over 4 intervals between average and maximum whereas the 10 values between 1 and 19 (respectively seven between 1 and 13) are themselves smoothed over 5 intervals. This observation is evident on the curve (b) which gives this impression of drop after the average value whereas the curve of the preceding diagram is increasing.

The detection of the special subhierarchies is particularly relevant in the contexts where the start of the curve situated before the special value is not very high, because the number of concepts concerned is then fairly marginal. It will therefore be seen that, with the distributions (a), (b) and (d), it is perfect. On the other hand, a distribution like that of (c), for which the first peak is less than or equal to P/$LS_p$, rules out numerous subhierarchies. This would also be the case with a decreasing distribution, with an inverted curve (b) for example.

It will finally be noted that the average does not necessarily cut the diagram into two equal parts with as many concepts on the left as there are on the right. (For example, with 1000 concepts of depth 1 and 50 concepts of depth 1 to 50, the average of the depths is 1000+1275=2275, or an average of approximately 2.2, with 1002 concepts on the left of the average and 48 on the right).

A more detailed description of a method of calculating and encoding a semantic and spatial similarity score by convergence relative to their common semantic characteristic respectively by separation according to their spatial distance for each concept $C_i$ with respect to a central concept $C_j$, taken two-by-two, will now be given below in conjunction with FIG. 5.

Whatever the case, the method that is the subject of the invention makes it possible to define a new metric exploiting the numbering over the hierarchy. No path associated with a special subhierarchy can be taken into account in this first presentation of the calculation and encoding method. These paths are, however, easily identifiable since they begin with the integer number max. In this first part of the presentation of the calculation and encoding method, the identifiers to be considered for a concept C therefore consist of the paths of the identifier of C which do not begin with max. If all the paths of C begin with max, then the concept C can be entirely discarded. It is thus considered that it does not belong to the ontology.

The metric defined according to the method that is the subject of the invention makes it possible to converge two concepts of the hierarchy spatially in addition to a semantic convergence. This is based on the similarity score presented known from the prior art explained previously.

To keep to the semantic aspect, the concepts are first converged according to the characteristics that they have in common, as in the calculation of a score presented above. However, to take account of the spatial separation (in number of generalization steps) of a concept, the penalty associated with the additional characteristics is increased. This penalty does, however, have the effect of generating a great difference between a generalization step (transition from a concept to its parent) and a specialization step (transition from a concept to its child).

Thus, in the phase described previously consisting in taking into account each defined characteristic of the concept $C_1$ absent from the ppcg to finalise the score, with Ph being the depth of the hierarchy, it can be seen that the loss of a characteristic by a concept of this hierarchy on a given path is 1/Ph. To readjust the loss of the characteristics by generalization and by specialization in order to obtain grouping centres that are relatively high, but distributed over the entire hierarchy, the penalty for each additional characteristic, denoted pen, must be increased without in any way exceeding 1/Ph:pen≦1/Ph.

Moreover, in the preceding calculation, the negative scores were not retained and were instantiated at 0. This would be justified by an exclusively semantic convergence of the concepts, because two concepts derived from different hierarchies have no common point.

Example: a comb is as semantically separate from a Tariff as from an EconomicTariff or an TariffForCouple.

On the other hand, when a spatial component is involved, a concept close to T is closer to the concepts of different hierarchies that its descendents.

Example: Tariff is spatially closer, in number of workthrough arcs of the encoded hierarchy, to comb than are EconomicTariff or TariffForCouple, specializing concepts of the TariffConcept.

According to the method of calculating and encoding a semantic and spatial similarity score that is the subject of the invention, it is therefore essential not to cancel the penalties that culminate on negative scores, because these negative scores also correspond to an order that has a direction from a spatial point of view.

To keep the values between 0 and 1, it is, nevertheless, appropriate to apply a certain standardization of the results obtained. To this end, a maximum value of a penalty is therefore added to the overall calculation, which makes it possible to obtain exclusively positive scores, and the score obtained is divided so that it is between 0 and 1. The maximum penalty is obtained only on the leaf concepts of the hierarchy located at the maximum depth Ph of the hierarchy. At least one of their paths contains Ph characters (or integers). The assigned surcharge is then Ph multiplied by the value of the penalty for each additional characteristic, which gives us at most Ph×pen. There is therefore obtained Ph×pen≦Ph×1/Ph and therefore Ph×pen≦1. The score on a path is obtained by the relation:

Proximity ratio–*pen*×|other defined characteristics of $C_1$|+*Ph*×*pen*=Score on a path.

A check is then made to ensure that the score is between 0 and (1+Ph×pen) by relying on the results already obtained by the preceding score: the proximity ratio is between 0 and 1, if the scores on a path are between 0 and 1 then the overall score will be between 0 and 1. (0) if the ratio is zero, if $C_1$ is a leaf located at the depth Ph, the |other defined characteristics of $C_1$| part is equal to Ph and the score on a path is zero. (1+Ph×pen) if the proximity ratio is maximum, the |other defined characteristics of $C_1$| part is zero, and the score on a path is (1+Ph×pen).

To obtain a score between 0 and 1 which does not change the initial order obtained, each score is divided on a path $NSS_{ij}$ by (1+Ph×pen) which makes it possible to ensure a score between 0/(1+Ph×pen) (0) and (1+Ph×pen)/(1+Ph×pen)(1).

The overall score corresponding to the average of the scores on each path remains asymmetrical given its semantic component.

Different values for the penalty have been studied. Among these values, pen=1/(2*Ph) is very appropriate to the use of an ontology stored in hierarchically numbered trellis form. By taking this calculation method, with Ph=4, the penalty changes to ⅛=0.125, Ph×pen=0.5 and (1+Ph×pen)=1.5 and the table T2 below is obtained. G and D gain 4 places in the classification compared to the calculation of the similarity scores described previously in the description and represented in table T1, and have converged with I. 4−3=1 is added to the first calculation on the first path, 4−4=0 to the second:

TABLE 2

| Concept | Trend | Semantic and spatial proximity score |
| --- | --- | --- |
| I | = | Average((((3 + 1)/4) − 0 + 0.5/1.5, (((4 + 0)/4) − 0 + 0.5/1.5) = 1 |
| H | = | Average((((2 + 1)/4) − 0 + 0.5/1.5, (((3 + 0)/4) − 0 + 0.5/1.5) = 0.833 |
| C | = | Average((((0 + 1)/4) − 0.25 + 0.5/1.5, (((2 + 0)/4) − 0 + 0.5/1.5) = 0.5 |
| G | +4 | Average((((1 + 1)/4) − 0 + 0.5/1.5, (((0 + 0)/4) − 0.125 + 0.5/1.5) = 0.46 |
| D | +4 | Average((((0 + 1)/4) − 0.125 + 0.5/1.5, (((1 + 0)/4) − 0 + 0.5/1.5) = 0.46 |
| B | −2 | Average((((0 + 1)/4) − 0.375 + 0.5/1.5, (((2 + 0)/4) − 0.125 + 0.5/1.5) = 0.42 |
| E | −2 | Average((((0 + 1)/4) − 0.375 + 0.5/1.5, (((2 + 0)/4) − 0.125 + 0.5/1.5) = 0.42 |
| A | −2 | Average((((0 + 1)/4) − 0.5 + 0.5/1.5, (((2 + 0)/4) − 0.25 + 0.5/1.5) = 0.33 |
| F | −2 | Average((((0 + 1)/4) − 0.5 + 0.5/1.5, (((2 + 0)/4) − 0.25 + 0.5/1.5) = 0.33 |

With reference to the exemplary implementation described previously in the description and table T2 explaining the semantic and spatial proximity score values $NSS_{ij}$ finally obtained, it will thus be understood that the process of calculating and encoding each of the abovementioned scores is executed with respect to a central concept belonging to the second subhierarchy of concepts, is performed by converging the concept $C_i$, that is, the concepts IHCGDBEAF of FIG. 1, with respect to the central concept, which is none other than the concept I in the above-mentioned example. This convergence is performed according to the common semantic characteristics of the latter and the separation of the concept $C_i$ concerned with respect to this central concept, the concept I in the example given, is performed by separation by a number of specialization steps with respect to the common general concept of the latter, the concept I, by assigning a penalty value, the value pen, according to the depth of the hierarchy of the concept.

It will be understood, in particular, that the calculation method described previously and the encoding of the semantic and spatial similarity score of the concepts taken two-by-two, relative to a centre concept, can be performed on the original ontology $H_c$, original hierarchy of concepts, or, on the contrary, by discarding from this last of the set of the concepts of this hierarchy of concepts, the concepts that belong to a special subhierarchy $H_{cs}$ forming the first subhierarchy of concepts mentioned previously in the description.

The encoding of the semantic and spatial similarity scores $NSS_{ij}$ results, on the one hand, from their calculation, and, on the other hand, from their arrangement and their classification according to their relative value.

With reference to FIGS. 2a and 2b, it will be recalled then that, in the case of FIG. 2a where the calculation is performed in the absence of any discarding of concepts because they belong to a special subhierarchy, the result obtained is suboptimal but that, on the other hand, in the case of FIG. 2b, where in the step 0, a special subhierarchy is discriminated and then the concepts $C_{is}$ belonging to a special subhierarchy are discarded, the encoding obtained is optimum.

With reference to the abovementioned table T2 and the method of calculating each path score $NSS_{ij}$, it is indicated that the semantic and spatial similarity score is a standardized value between 0 and 1, defined as the average for each path of the proximity ratio reduced by the product of the value of the penalty and the number of other defined characteristics of the concept increased by the maximum penalty that is the product of the depth of the hierarchy of concepts and the value of the penalty applied.

The method that is the subject of the present invention can also be implemented, in particular for calculating the distance function and in the final analysis the score of semantic and spatial similarity between two concepts taken two-by-two, so as to take account of any concept of the original hierarchy of concepts $H_c$ of which all or part of the paths of the identifier of this concept belong to at least one special subhierarchy.

This procedure then makes it possible to totally optimize the encoding of the hierarchy of concepts with no significant loss of information not only regarding the semantic similarity but also regarding the spatial similarity of the concepts represented in the ontology or original hierarchy of concepts.

In this second method of calculating and encoding the proximity score between concepts, the concepts of which all or part of the paths of the identifier belong to at least one special subhierarchy are considered. In this second calculation and encoding method, the identifiers to be considered for a concept C therefore consist of the paths of the identifier of C which begin with max.

Of the special subhierarchies, the spatial aspect has already been dealt with, so all that remains is to semantically converge the concepts, by using, for example, the semantic proximity score as has been defined in the thesis by Alain Bidault at the Université Paris-Sud entitled *Affinement de Requêtes possées à un Médiateur"* (serial number 6932), July 2002, mentioned previously in the description.

To obtain a general score between two concepts whatever the origins of their paths, three cases or conditions $C_1$, $C_2$, $C_3$ are determined, which can be presented:

$C_1$: if none of the two identifiers of the concepts has a path deriving from a special subhierarchy or if both have all their paths deriving from a special subhierarchy, then only one of the two scores can be obtained, and it is that which corresponds to the proximity score between these two concepts. For example: P2("981") and P3("982") or P5("4") and P6("321").

$C_2$: otherwise, if each identifier has at least two paths, one deriving from a specialist subhierarchy and another that does not belong to a special subhierarchy, then a weighted average is calculated between the two scores obtained according to the number of paths participating in each of the scores. For example: P4("42", "981") and P7("2145", "9624", "985"). For this score, there are 2 normal paths for 3 special paths. The first score weighted by 2/5 is therefore added to the second score weighted by 3/5.

$C_3$: otherwise, the case applies in which at least one of the identifiers is entirely discarded for a part of the calculation (either because it contains no path deriving from a special subhierarchy, or because all its paths are derived from a special subhierarchy). In the latter case, the score or scores for which there is no path is/are zero. This value is employed in the calculation of the general score, weighted according to the number of paths involved. Example: P2("981") and P6("321") or P5("4") and P3("982") or P7("2145", "9624", "985") and P3("982"). P2 and P6 or P5 and P3 will have a general zero score. For P7 and P3, their score will be weighted to 3/4 for "9624", "985", "982"+¼*0 for "2145".

A general description of the procedure for executing the calculation and encoding of a score between two concepts whatever the origins of their path, relative to whether or not these concepts belong to a special subhierarchy will now be given in conjunction with FIG. 5.

In the abovementioned FIG. 5, two concepts $C_i$ and $C_j$ are considered, with which are associated an identifier $I_i$ respectively $I_j$, each identifier being in the form of the relation 14 of FIG. 5:

$$I_i = \{PATH_{ki}\}_{k=1}^{k=K} \text{ and } I_j = \{PATH_{k'j}\}_{k'=1}^{k'=K'}$$

Of the abovementioned concepts, a logical check is carried out according to the relation 15 corresponding to the condition $C_1$ previously mentioned in the description.

$\forall k, PATH_{ki} \neq \max|T_{ki} \text{ ET} \forall k', PATH_{k'j} \neq \max|T_{k'j}$

OR $\forall k, PATH_{ki} = \max|T_{ki} \text{ AND } \forall k', PATH_{k'j} = \max|T_{k'j}$.

In the above relation, $PATH_{ki}$ represents a path of rank k of the identifier $I_i$, K designating a maximum number of paths for the identifier $I_i$ considered;

$PATH_{k'j}$ designates a path of rank k' of the identifier $I_j$, K' designating the maximum number of paths of this identifier;

max|$T_{ki}$ and max|$T_{kj}$ designate a path prefixed by the maximum integer value max, $T_{ki}$ and $T_{kj}$ designating any path tails associated with the prefix value max;

OR represents the logical relation of the alternative if none of the two identifiers or if both have all their paths previously mentioned in the condition $C_1$ in the description.

On a positive response to the test 031, then the condition $C_1$ is verified and the chosen score is that which corresponds to the proximity score between the two concepts, or $NSS_{ij}=NPROX_{ij}$.

On a negative response to the test 031, a test 032 is called which makes it possible to implement the condition $C_2$ described previously in the description. This condition $C_2$ is represented by the logical relation:

$K \geq 2$ AND $K' \geq 2$

AND $\exists PATH_{kj}=MAX|T_{kj}$ AND $\exists PATH_{kj} \neq MAX|T_{kj}$

AND $\exists PATH_{k'j}=max|T_{k'j}$ AND $|PATH_{k'j} \neq max|T_{k'j}$.

In the relation 17, it will be understood that the same variables designate the same entities as in the relation 15.

On a positive response to the test 032, the condition $C_2$ is satisfied and the semantic and spatial similarity score $NSS_{ij}$ is calculated and encoded as a weighted average between the two scores obtained n($PATH_{ki}$), n($PATH_{k'j}$), according to the number of paths participating in each of the scores.

On the contrary, on a negative response to the test 032, a step 033 is called which corresponds to the condition $C_3$ according to which at least one of the identifiers is totally discarded, either because it does not belong to a special subhierarchy, or because it belongs to a special subhierarchy where the semantic and spatial similarity scores for which there is no path and/or are taken to be equal to 0. The semantic and spatial similarity score is calculated and encoded as a weighted average between this zero score and the other score.

This operation is represented by the relation 19:

$n(PATH_{ki})$, OR $n(PATH_{kj})=0$ $NSS_{ij}=N[n(PATH_{ki}), n(PATH_{kj})]$.

Of course, the invention also covers a computer program comprising a series of instructions stored on a storage medium for execution by a computer or by a system for consulting an ontology stored in hierarchically numbered trellis form. This computer program is noteworthy in that, on its execution, the instructions execute the calculation and encoding of a semantic and spatial similarity score by convergence relative to their common semantic characteristics, respectively by separation according to their distance for each concept with respect to a central concept, taken two-by-two, as described previously in the description in conjunction with FIG. 2a and the subsequent figures.

It will be understood in particular that the abovementioned computer program can be implemented in the form of a separate software module for executing, for example, the calculation and encoding of the semantic and spatial similarity score, respectively the discrimination in the original hierarchy of concepts, of at least one special subhierarchy defined as a subset of concepts, of which the number of concepts and the depths of the descendents of the concepts of this subset of concepts is less than a threshold subset.

Finally, one example of possible use of the semantic and spatial similarity scores $NSS_{ij}$ obtained in accordance with the abovementioned table T2 will be given in the framework of a number of contexts in conjunction with FIG. 6.

The use of a semantic and spatial metric is of interest in a number of contexts such as:

firstly, in the framework of a formulation of requests on a large ontology. This semantic and spatial similarity score provides a basis for displaying and therefore consulting a wide and diversified hierarchy. It can thus serve to propose a summary version of the hierarchy of concepts by limiting the number of concepts in the display to display only the "central" concepts with respect to the different subhierarchies. The concepts are said to be central if they are semantically and spatially close to several concepts, other concepts, so close that the other concepts do not need to be represented in the summary version of the hierarchy.

Example: it is possible to summarize on the right of FIG. 6 the hierarchy of concepts represented in FIG. 1 on the left, to retain only every second concept. The hierarchy has been semantically and spatially divided into 5 groupings each symbolized by a polygon, 4 of which contain two concepts and one is restricted to the concept I;

this semantic and spatial similarity score can also be used heuristically for the exhaustive presentation algorithms of large graphs in order to determine if such or such a node or concept needs to be converged with another by avoiding the costly and complex calculations of smaller common generalizers between several concepts. Example: the current tools for displaying large graphs present clouds of dots, somewhat illegible, but which give a spatial and graphic representation (in the form of nodes and arcs between these nodes) of the hierarchy by minimizing the arc crossing-points to facilitate reading. The choice of the packets of concepts or of the position of certain concepts in the drawing representing the graph can be oriented by this proximity score.

The invention finally covers a device DIV for calculating and encoding a score of semantic and spatial similarity between concepts of an ontology stored in hierarchically numbered trellis form, as represented, in a nonlimiting manner, in FIG. 7. This device DIV can, for example, be directly incorporated in an ontology provider $H_c$, or, as represented in FIG. 7, connected by a network to the latter. It comprises, in this latter assumption, in addition to the input/output units I/O, a central processing unit CPU, a RAM memory and a programmable memory PM for example, the resources for calculating and encoding, formed by a computer program module $M_o$, a semantic and spatial similarity score $NSS_{ij}$ for each concept with respect to a central concept taken two-by-two, by convergence relative to their common semantic characteristics, respectively by separation according to their spatial distance, by assignment of a penalty score pen, as described previously in conjunction with FIGS. 4a to 4c and 5.

In addition, the device DIV also comprises a device for discriminating special subhierarchies, formed by a computer program module $M_1$, of which the depth of each of the concepts satisfies the function "IsSpecial(C)" described in conjunction with FIGS. 3$a_1$ and 3$a_2$.

It finally comprises a resource for renumbering concepts formed by a computer program $M_2$, making it possible to prefix any identifier of a concept belonging to a special subhierarchy with the smallest positive integer number max not yet assigned to the concepts of the complete hierarchy of concepts $H_c$, as described previously in conjunction with FIG. 3*b*.

The invention claimed is:

1. Method of calculating and encoding a score of semantic and spatial similarity between concepts of an ontology stored in hierarchically numbered trellis form, each concept of the trellis having an associated identifier comprising at least one path, each path consisting of a series of integers and corresponding to a succession of arcs oriented between the concept to which said at least one path is allocated and the universal concept to form a hierarchy of concepts under the universal concept, each path associated with said concept defining a route through successive parent, respectively child, concepts, making it possible to reach the concept, wherein the method consists at least in calculating and encoding a semantic and spatial similarity score by convergence relative to their common semantic characteristics respectively by separation according to their spatial distance for each concept with respect to a central concept, taken two-by-two.

2. Method according to claim 1, wherein, prior to the step consisting in calculating a semantic and spatial similarity score, said method also consists in discriminating, in said hierarchy of concepts, at least one special subhierarchy, defined as a subset of concepts, of which the number of child concepts and the depth of the descendents of said concepts of this subset of concepts is less than a threshold value, said hierarchy of concepts being subdivided into a first subhierarchy of concepts containing said at least one special subhierarchy and into a second subhierarchy of concepts containing the other concepts of the hierarchy of concepts not belonging to said first subhierarchy, given the fact that each concept belongs, respectively does not belong, to said at least one special subhierarchy.

3. Method according to claim 2, wherein a special subhierarchy is defined as a subhierarchy of said hierarchy of concepts, of which the depth of each of the concepts is less than a determined maximum special subhierarchy depth value and of which the number of child concepts for one of each of these concepts is less than a determined maximum special subhierarchy width value.

4. Method according to claim 2, wherein the step consisting in discriminating, in said hierarchy of concepts, at least one special subhierarchy, includes at least one renumbering of said concepts, said renumbering consisting in prefixing any identifier of a concept belonging to a special subhierarchy with the smallest positive integer number not yet assigned to the concepts of the hierarchy of concepts.

5. Method according to claim 3, wherein the step consisting in discriminating, in said hierarchy of concepts, at least one special subhierarchy, includes at least one renumbering of said concepts, said renumbering consisting in prefixing any identifier of a concept belonging to a special subhierarchy with the smallest positive integer number not yet assigned to the concepts of the hierarchy of concepts.

6. Method according to claim 1, wherein the step for calculating and encoding a semantic and spatial similarity score includes at least the step consisting in calculating and encoding a score of similarity of a concept with respect to a central concept belonging to said second subhierarchy of concepts by converging said concept with respect to the central concept according to the common semantic characteristics of the latter and by separating said concept with respect to said central concept by a number of specialization steps with respect to the general concept common to the latter, by assigning a penalty value, dependent on the depth of said hierarchy of concepts.

7. Method according to claim 1, wherein the step for calculating and encoding a semantic and spatial similarity score also includes the step consisting in discarding from the set of the concepts of said hierarchy of concepts any concept belonging to said at least one special subhierarchy forming said first subhierarchy of concepts.

8. Method according to one of claims 6 or 7, wherein said semantic and spatial similarity score is a standardized value between 0 and 1, defined as the average for each path of the proximity ratio reduced by the product of the value of the penalty and the number of other defined characteristics of said concept and increased by the maximum penalty, product of the depth of said hierarchy of said concepts and the value of the penalty.

9. Method according to one of claims 4 to 7, wherein the latter also consists in taking account of any concept of which all or part of the paths of the identifier of this concept belongs to at least one special subhierarchy.

10. Method according to one of claims 4 to 7, wherein, to calculate and encode a score of semantic and spatial similarity between a first and a second concept of a hierarchy of concepts, independently of whether they belong or do not belong to a special subhierarchy, said method includes:
   if none of the identifiers of said concepts includes a prefixed path belonging to a special subhierarchy, or
   if in the paths all the identifiers are prefixed and belong to a special subhierarchy, the semantic and spatial similarity score is calculated as the proximity score between these two concepts; otherwise,
   if each identifier has at least two paths of which one belongs to a special subhierarchy and of which the other does not belong to a special subhierarchy, the semantic and spatial similarity score is calculated and encoded as a weighted average between the two scores obtained according to the number of paths participating in each of the scores; otherwise,
   at least one of the identifiers being totally discarded, either because it does not belong to a special subhierarchy, or because it belongs to a special subhierarchy, the or each semantic and spatial similarity score for which there is no path, is taken to be equal to zero, the semantic and spatial similarity score is calculated and encoded as a weighted average between this zero score and the other score.

11. Computer program medium comprising a series of instructions stored on a storage medium for execution by a computer or by a system for consulting an ontology scored in hierarchically numbered trellis form, wherein said program, on its execution, executes the calculation and encoding of a semantic and spatial similarity score by convergence relative to their common semantic characteristics, respectively by separation according to their distance for each concept with respect to a central concept, taken two-by-two, according to one of claims 1 to 7.

12. Computer program medium comprising a series of instructions stored on a storage medium for execution by a computer or by a system for consulting an ontology scored in hierarchically numbered trellis form, wherein said program, on its execution, executes the calculation and encoding of a semantic and spatial similarity score by convergence relative to their common semantic characteristics, respectively by separation according to their distance for each concept with respect to a central concept, taken two-by-two, according to claim 8.

13. Computer program medium comprising a series of instructions stored on a storage medium for execution by a computer or by a system for consulting an ontology scored in hierarchically numbered trellis form, wherein said program, on its execution, executes the calculation and encoding of a semantic and spatial similarity score by convergence relative to their common semantic characteristics, respectively by separation according to their distance for each concept with respect to a central concept, taken two-by-two, according to claim 9.

14. Computer program medium comprising a series of instructions stored on a storage medium for execution by a computer or by a system for consulting an ontology scored in hierarchically numbered trellis form, wherein said program, on its execution, executes the calculation and encoding of a semantic and spatial similarity score by convergence relative to their common semantic characteristics, respectively by separation according to their distance for each concept with respect to a central concept, taken two-by-two, according to claim 10.

15. Device for calculating and encoding a score of semantic and spatial similarity between concepts of an ontology stored in hierarchically numbered trellis form, wherein said device comprises at least means of calculating and encoding a semantic and spatial similarity score by convergence relative to their common semantic characteristics respectively by separation according to their spatial distance for each concept with respect to a central concept, taken two-by-two.

16. Device according to claim 15, wherein said device also comprises:
- means of discriminating special subhierarchies, of which the depth of each of the concepts is less than a determined maximum special subhierarchy depth value and of which the number of child concepts for one of each of these concepts is less than a determined maximum special subhierarchy width value;
- means of renumbering said concepts, said renumbering consisting in prefixing any identifier of a concept belonging to a special subhierarchy with the smallest positive integer number not yet assigned to the concepts of the hierarchy of concepts.

* * * * *